Figure 1:
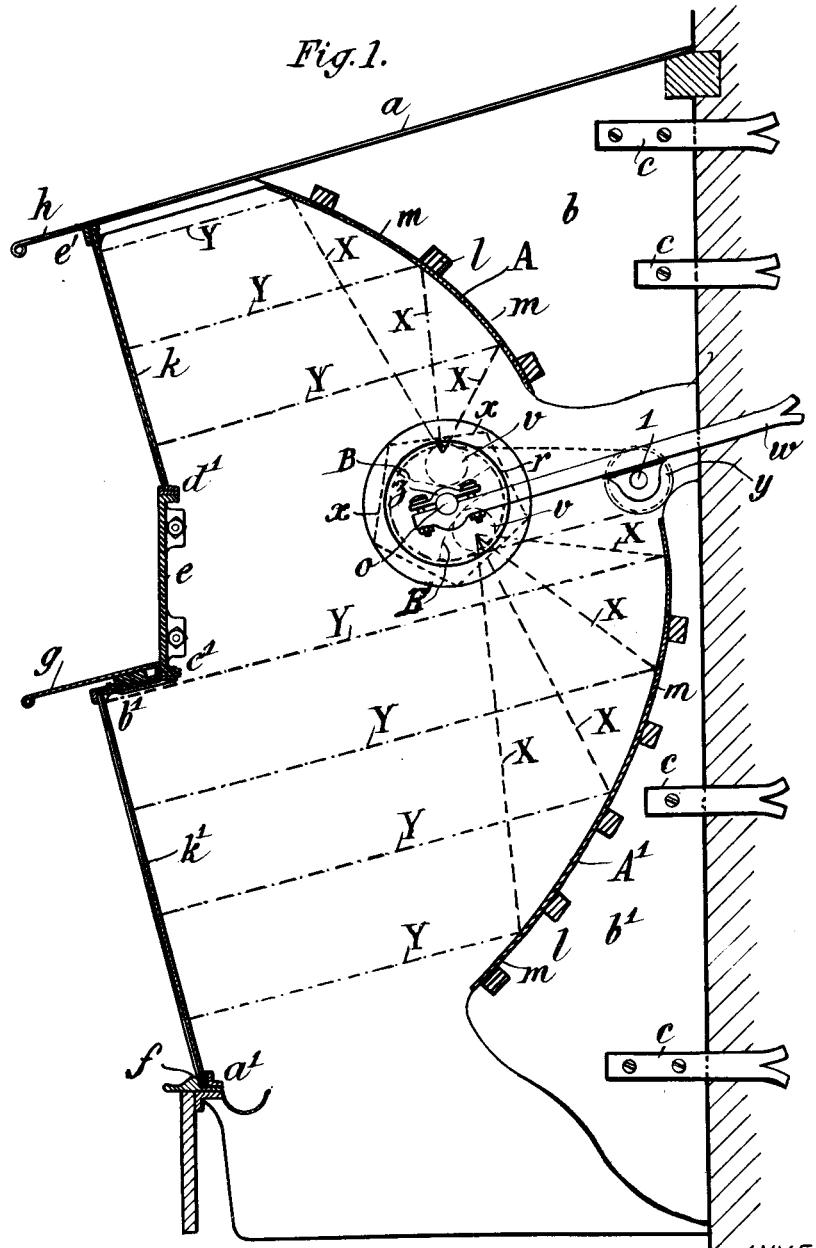

J. EMRINGER.
MEANS FOR PRODUCING AND EXHIBITING LUMINOUS SIGNS.
APPLICATION FILED JAN. 5, 1910.

1,038,736.

Patented Sept. 17, 1912.

3 SHEETS—SHEET 1.

J. EMRINGER.
MEANS FOR PRODUCING AND EXHIBITING LUMINOUS SIGNS.
APPLICATION FILED JAN. 5, 1910.
1,038,736.
Patented Sept. 17, 1912.
3 SHEETS—SHEET 2.
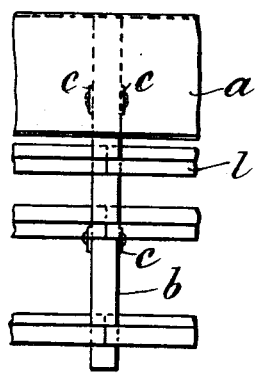
Fig. 2
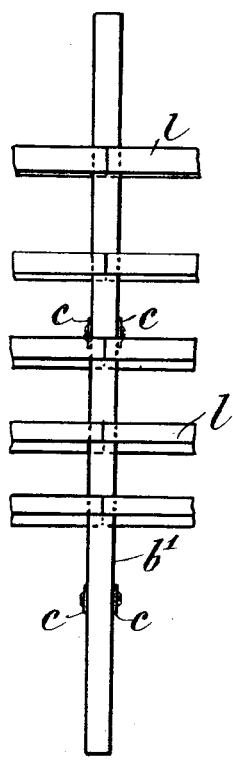
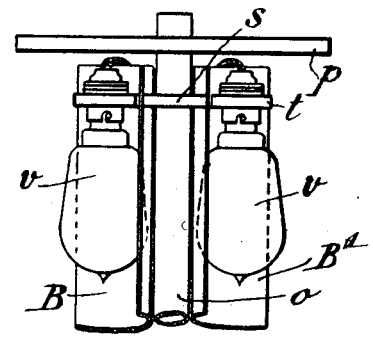
Fig. 4.
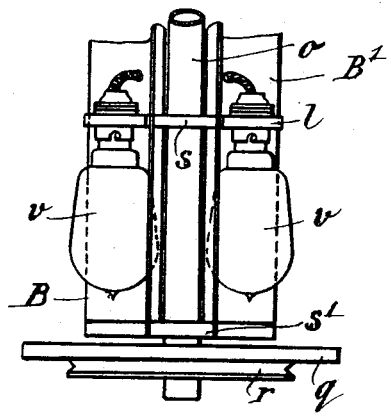
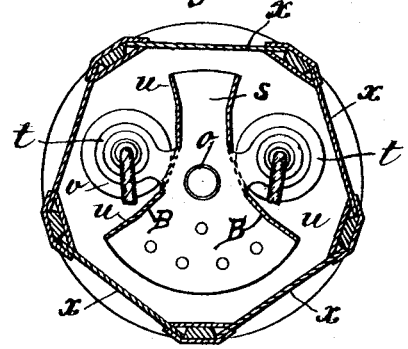
Fig. 5.
WITNESSES:
René Bruine
William F. Martinez
INVENTOR:
Jules Emringer,
By Attorneys,
Arthur E. Frasen & Kenia J. EMRINGER.
MEANS FOR PRODUCING AND EXHIBITING LUMINOUS SIGNS.
APPLICATION FILED JAN. 5, 1910.
1,038,736.
Patented Sept. 17, 1912.
3 SHEETS—SHEET 3.
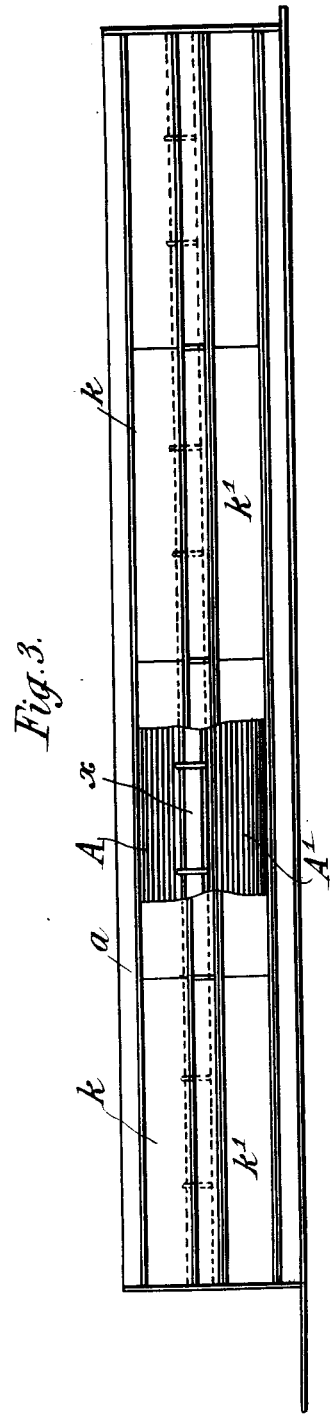
WITNESSES:
INVENTOR:
Jules Emringer,
By Attorneys,

UNITED STATES PATENT OFFICE.

JULES EMRINGER, OF PARIS, FRANCE.

MEANS FOR PRODUCING AND EXHIBITING LUMINOUS SIGNS.

1,038,736.  Specification of Letters Patent.  Patented Sept. 17, 1912.

Application filed January 5, 1910. Serial No. 536,581.

*To all whom it may concern:*

Be it known that I, JULES EMRINGER, a citizen of the Republic of France, residing in Paris, France, have invented certain new and useful Improvements in Means for Producing and Exhibiting Luminous Signs, of which the following is a specification.

This invention relates to means for producing and exhibiting luminous signs, advertisements and the like, and more particularly to those in which inscriptions are made by hand or otherwise on the back surface, blackened with a suitable paste, of a translucent glass, by removing the said paste with a stylus, the said glass being lighted up from a luminous source placed behind it so as to cause the luminous inscriptions to appear.

To enable the invention to be fully understood as well as the manner of carrying it into effect, I will describe the same by reference to the accompanying drawing, in which:—

Figure 1 represents as an example, a side view partly in section of my improved arrangement. Fig. 2 shows a partial front view of the supports of the parabolic mirrors. Fig. 3 is a longitudinal view drawn to a smaller scale of the arrangement, part of the front being broken away to show the interior view. Figs. 4 and 5 represent the drum as well as the luminous source which it contains, respectively in plan and transverse section.

The arrangement consists of three principal parts; namely, the frame of the superstructure, the reflecting mirrors and the drum.

The superstructure framing comprises the roofing $a$ supported by buttresses embedded in the wall and not shown in the drawing, which buttresses in suitable number are placed at given distances apart throughout the length of the installation. The two sides are closed by plain sheet iron plates for example. A girder $e$ between two glasses $k$ and $k'$ is bolted at its end to the said iron sheets and supported at certain distances intermediate its ends, if desired. At the lower part of the girder $e$ is attached a small sloping projection $g$ similar to the part $h$ of the roof, this projection being designed to obviate the effect of a too strong day light.

The glasses $k$ $k'$ are striated pieces, of St. Gobian manufacture for example, and they are placed with the striations vertical and outside. These glasses $k$ $k'$ are covered on their inner faces with a suitable relatively opaque paste or covering preferably a black paste or paint which is readily removable in parts by a stylus or the like to produce script, pictures or the like upon the glasses. The parabolic reflectors rest upon wood brackets $b$, $b'$ cut to a given mold and fixed to the wall by iron brackets $c$ placed at suitable distances apart. On these brackets are placed longitudinal bars $l$ and the whole surface is provided with longitudinal lathing. The silvered glasses $m$ which together form the parabolic mirrors A, A' are then placed in the direction of the width above the said lathing as well as on the said bars.

The drums are formed of a shaft $o$ which carries at its ends two plates $p$, $q$ mounted with ball bearings on the shaft $o$, one of the said plates being fixed on to a grooved wheel $r$ by which the drum is actuated. On the shaft $o$ which is stationary, are arranged supports $s$, $s'$ as shown in Fig. 5 which supports serve to carry the mirrors $u$ which together form the parabolic mirrors B, B'. The lugs $t$ of the supports $s$ serve to carry the sockets or holders of the lamps $v$. On the plates $p$ and $q$ are fixed in any suitable manner in the form of a pentagonal prism, as shown in Fig. 5, the glasses $r$ colored red, yellow, green, white, blue, etc. The wire conductors which supply the lamps are passed through holes made in the supports $s$, $s'$. The drums which are arranged in axial alinement are supported as shown by iron brackets $w$ embedded in the wall and provided with caps $z$ screwed to the brackets so as to suitably clamp the shaft $o$.

Over the pulley $r$ passes a driving band which also passes over a pulley of smaller diameter $y$, Fig. 1 and all the pulleys $y$ are keyed on a common shaft 1 which can be actuated by hand by means of a crank handle or mechanically, for example, by means of a small electric motor. Instead of the pulleys $r$ and $y$ two toothed wheels may be employed with a chain passing around them.

As shown, owing to the parabolic reflectors B, B' the rays $x$, $x$ emitted by the electric lamps as well as those which are reflected, strike the parabolic mirrors A, A' and are thrown back in parallel rays Y, Y on to the lower and upper glasses $k'$, $k$. Moreover the number of colored glasses $x$ carried by the drum is always such that the rays emitted by the lamps and which strike the lower and upper parabolic mirrors are all colored, for instance, in the example represented in Figs. 1 and 5, the colored glasses form a true pentagonal prism.

It is obvious that this arrangement may have various suitable dimensions according to the use for which it is designed and according to the police regulations of different towns. Similarly the inclination of the glasses will vary with the height at which the luminous sign is placed.

The installation just described has been more particularly designed for adaptation to a balcony on which the operator who makes the signs can walk along so as to shift his position.

Having now particularly described and ascertained the nature of my said invention and in what manner the same is to be performed, I declare that what I claim is:—

1. Means for producing and exhibiting luminous signs comprising in combination a translucent glass blackened on its inner surface with a removable paste, a source of light, a mirror close behind said source of light and a second mirror adapted to receive the rays from said first mirror and spaced to the rear of said translucent glass to permit access of the operator to the back thereof.

2. An apparatus of the class described including in combination a pair of reflectors, a source of light arranged in front of and intermediate said reflectors, each of said reflectors reflecting light independently of the other, and a pair of translucent glasses blackened on their inner faces with a removable paste and located one in line with the reflected rays from each of said reflectors.

3. An apparatus of the class described including in combination a pair of reflectors, a source of light arranged between said reflectors, each of said reflectors reflecting light independently of the other, and a pair of translucent glasses blackened on their inner faces with a removable paste and located one in line with the reflected rays from each of said reflectors, said source of light comprising a lamp for each of said reflectors, and a second pair of reflectors for throwing the rays of said lamp on said first pair of reflectors.

4. Means for producing and exhibiting luminous signs comprising in combination a pair of translucent glasses located one above the other, a rod behind said glasses and intermediate the same, a source of light mounted upon said rod, a drum having a plurality of colored glasses around its periphery revolubly mounted upon said rod and inclosing said source of light, and reflectors above and below said drum and source of light, adapted to reflect the light from said source of light through the upper and lower translucent glasses respectively.

5. Means for producing and exhibiting luminous signs comprising in combination a pair of translucent glasses located one above the other and blackened on their inner faces with a removable paste, whereby portions thereof may be removed with a stylus, a rod behind said glasses and intermediate the same, a source of light mounted upon said rod, a drum having a plurality of colored glasses around its periphery revolubly mounted upon said rod and inclosing said source of light, and reflectors above and below said drum and source of light, adapted to reflect the light from said source of light through the upper and lower translucent glasses respectively, said reflectors being arranged sufficiently distant from said translucent glasses to permit access to the inner blackened faces of said glasses by an operator.

In witness whereof, I have hereunto signed my name in the presence of two subscribing witnesses.

JULES EMRINGER.

Witnesses:
DEAN B. MASON,
GABRIEL BELLIARD.